Figure 1:
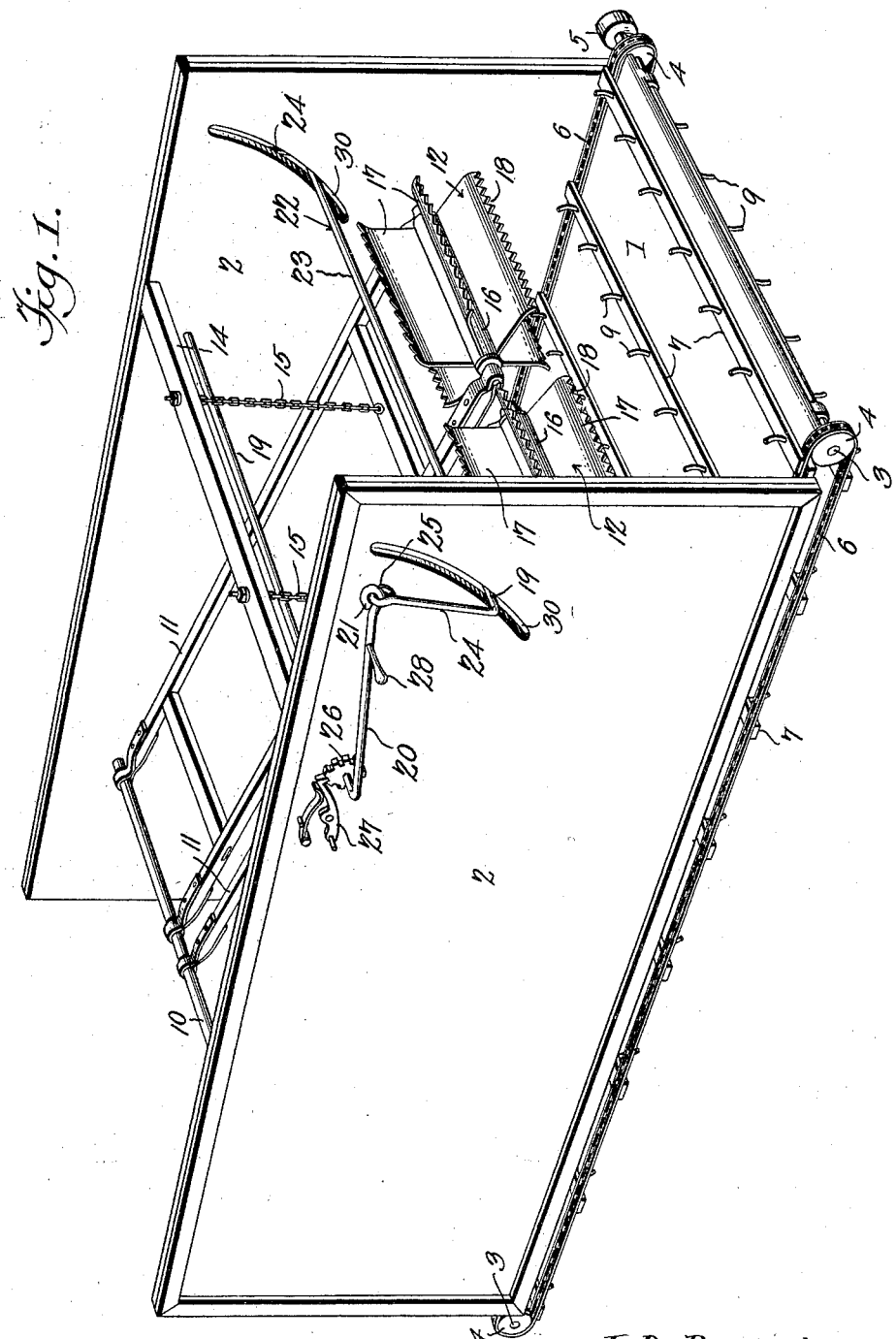

No. 744,994. PATENTED NOV. 24, 1903.
J. D. BARTON.
FEEDER FOR THRESHING MACHINES.
APPLICATION FILED APR. 9, 1903.
NO MODEL. 2 SHEETS—SHEET 1.

Witnesses
J. D. Barton, Inventor,
by
Attorneys

No. 744,994. PATENTED NOV. 24, 1903.
J. D. BARTON.
FEEDER FOR THRESHING MACHINES.
APPLICATION FILED APR. 9, 1903.
NO MODEL. 2 SHEETS—SHEET 2.
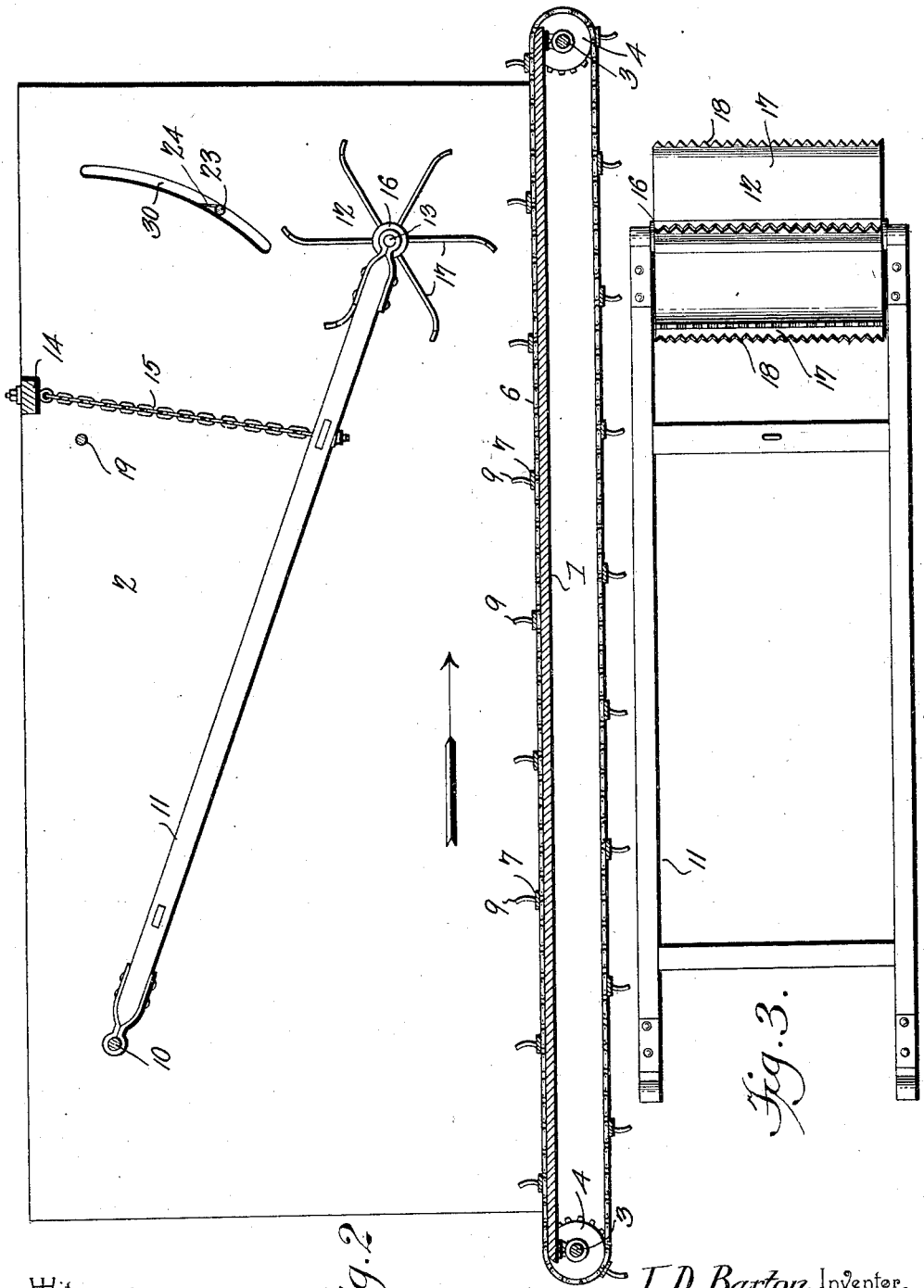

No. 744,994. Patented November 24, 1903.

UNITED STATES PATENT OFFICE.

JOHN D. BARTON, OF LAWRENCE, KANSAS.

FEEDER FOR THRESHING-MACHINES.

SPECIFICATION forming part of Letters Patent No. 744,994, dated November 24, 1903.

Application filed April 9, 1903. Serial No. 151,901. (No model.)

*To all whom it may concern:*

Be it known that I, JOHN D. BARTON, a citizen of the United States, residing at Lawrence, in the county of Douglas and State of Kansas, have invented a new and useful Feeder for Threshing-Machines, of which the following is a specification.

This invention relates to feeders for threshing-machines.

The object of the invention is to provide an improved form of feeder for threshing-machines which will insure the proper spreading of the grain in the sheaves as they pass into the machine and by means of which the rate of feed of grain to the machine may be adjusted to the capacity of the machine.

A further object of the invention is to provide a feeder in which it is impossible for an excess of grain to be fed to the machine, thereby preventing possibility of clogging from overfeeding.

With the objects above stated in view and others which will appear as the invention is more fully understood the same consists in the construction and combinations of parts of a feeder for threshing-machines hereinafter described and claimed, and shown in the accompanying drawings, forming a part of this specification, in which like parts are designated by the same characters of reference throughout, it being understood that changes in the form, proportions, and arrangement of the parts may be made without departing from the spirit of the invention or sacrificing any of the advantages thereof.

In the drawings, Figure 1 is a perspective view of the feeder looking downward from the front and from one side of the machine. Fig. 2 is a vertical longitudinal section through the feeder on the median line. Fig. 3 is a detail view in plan of one of the gage-supports with a rotary gage member mounted thereon.

Referring to the drawings, 1 designates the bottom and 2 2 the side walls of the feeder-box.

3 3 are shafts extending across the bottom of the feeder-box at either end, upon which are rigidly mounted sprockets 4 4 4 4 and on one of which is provided a pulley 5, to which power is transmitted from any suitable source for driving the feed mechanism. Running over the sprockets 4 4 4 4 are two endless sprocket-chains 6 6, to which are secured a plurality of parallel feeder-bars 7 7, disposed transversely of the feeder-box and each provided with a plurality of curved teeth 9 so disposed that the convexity of the curve of each tooth is directed toward the threshing-machine as the teeth travel forward in feeding.

Extending across the feeder-box, near the rear end and slightly below the top thereof, is a bar 10, upon which are mounted so as to oscillate thereon a pair of supporting-frames 11 11, each of which has mounted between the sides thereof at its forward end a rotary gage member 12, which is freely movable on a short shaft 13, carried by the supporting-frames 11. To prevent the rotary gage members 12 from coming into contact with the teeth on the traveling feed-bars, I provide a transverse bar 14 near the forward end of the feeder and having extending downward therefrom a pair of chains 15, each of which is attached at its lower end to one of the supporting-frames 11 and limits the downward movement thereof.

Each of the rotary gage members 12 consists of a hub 16 and a plurality of wings 17, which are preferably curved, so that the wings below the supporting-shaft always present a convexity toward the threshing-machine. The edges of the rotary gage members are preferably provided with serrations 18, which aid in separating the grain, as will hereinafter be pointed out.

Rotatably mounted in a side wall of the feeder-box just to the rear of the chains 14 is a rod 19, having at each end a crank portion 20, which extends forward and terminates in an eye 21. Suspended from the eyes 21 is a stop-rod 22, having a horizontal middle portion 23 and end portions 24, disposed at right angles thereto and terminating in eyes 25, which are linked with the eyes 21, provided at the ends of the crank portions of the rod 19.

On the rod 19, outside of the walls and near one of the crank portions 20 of said rod, is rigidly secured a ratchet-wheel 26, which is engaged by a spring-pawl 27, mounted on the outside surface of one of the side walls of the feeder-box adjacent to said ratchet. At the same end of rod 20 to which the ratchet-wheel is attached I provide a handle 28, by means of which said rod 19 may be shifted in position when the teeth of the ratchet-wheel are released from engagement with the pawl, so that the ratchet will be free to move.

The stop-rod 22, mentioned in the preceding paragraph as supported by the cranked ends of rod 19, passes through curved slots 30, provided in the side wall of the feeder-box. The curved slots are formed in arcs having a radius equal to the length of the gage-supporting frames 11 and are so formed in order that as the stop-rod is moved up or down in the slots it will always be over the hubs of the rotary gage members 12 when the gage members are brought into contact with said stop-rod.

In operation power is communicated to the machine through the pulley 6, provided on one of the shafts 3, and the endless sprocket-chains 7 are continuously driven in a direction to cause the feeder-bars to pass over the bottom of the feeder-box in the direction indicated by the arrow in Fig. 2. Grain is thrown into the feeder-box in the form of sheaves with the bands cut and removed therefrom and is carried forward by the teeth of the feeder-bars 8, passing under the rotary gage members 12 and being separated thereby, so as to pass into the threshing-machine in a layer of approximately uniform thickness. If the grain reaches the rotary gage members in a pile of such size that it can not pass under the gage members as they appear in Fig. 2, the gage members and the supporting-frames therefor will be raised by the grain, and if the mass of grain is sufficiently large the upper portion of the rotary gage members will contact with the stop-rod 22, which will stop the rotation of the gage members and will cause the upper portion of the pile of grain to be caught behind the then stationary gage members and held there until the forward travel of the feed-bars removes the lower portion of the pile and permits the excess caught behind the gage members to drop down and pass under the gage members, which will then be allowed to descend to their normal position and to rotate as usual.

If the threshing-machine is one of small capacity, which would be readily choked by the passage of a considerable quantity of grain thereinto, the stop-rod 22 will be disposed in position near the bottom of the slots 30, through which it passes, and the rotary gage members 12 will be brought into contact with the stop-rod whenever they are raised a very slight distance by the passage of the grain beneath them. Consequently the amount of grain which can pass under the rotary gage members at any time when the stop-rod is adjusted in position near the bottom of the slots will be small.

With a machine of large capacity the stop-rod will be adjusted in higher position or will be raised to the top of the slots, so that the rotary gage members will never come in contact therewith, but will simply serve to spread the grain over the feeder-bars before it passes into the threshing-machine.

Ordinarily the frames 11, at the free ends of which the rotary gage members are mounted, will be supported by chains 14 in such position that the lower wings of the gage members just escape contact with the teeth 9 on the feed-bars 7. It is obvious, however, that if very rapid feed of grain to the thresher is desired the chains 14 may be shortened, so that the gage members will be at a greater height above the teeth 9 and will permit the passage of larger quantities of grain to the machine.

Having thus described the construction and operation of my invention, what I claim as new, and desire to secure by Letters Patent, is—

1. The combination in a feeder for threshing-machines of a feeder-box, an endless carrier traveling over the bottom of said feeder-box, means for imparting movement to said carrier, a pivoted frame mounted above said carrier, a rotatable gage member mounted at one end of said frame, and a stop-rod disposed transversely of said feeder-box above said rotatable gage member.

2. The combination in a feeder for threshing-machines of a feeder-box, an endless carrier traveling over the bottom of said box; means for imparting motion to said carrier, a frame above said carrier pivotally mounted at one end and having at the other end a shaft upon which is rotatably mounted a gage member having a plurality of wings, and a vertically-adjustable stop-rod disposed transversely of said feeder-box above said gage member.

3. The combination in a feeder for threshing-machines of a feeder-box, an endless carrier traveling over the bottom of said feeder-box, means for imparting movement to said carrier, a frame in said feeder-box pivotally mounted at one end and having at the other a rotary gage member, a transverse bar extending across said feeder-box, and a flexible supporting connection between said transverse bar and said pivoted frame.

4. The combination in a feeder for threshing-machines of a feeder-box, an endless carrier traveling over the bottom of said feeder-box, means for imparting movement to said carrier, a pivoted frame in said feeder-box, a rotary gage member carried by said frame, a crank-rod supported in bearings in the side of said feeder-box, a stop-rod carried by said crank-rod, and a pawl-and-ratchet mechanism associated with said crank-rod for adjusting the position thereof.

5. The combination in a feeder for threshing-machines of a feeder-box, an endless carrier traveling over the bottom of said feeder-box, means for imparting movement to said endless carrier, a frame in said feeder-box pivotally mounted at one end and having at the other end a rotary gage member, said feeder-box having slots provided in the sides thereof above the free ends of said pivoted frames, said slots being curved in arcs having a radius equal to the length of said pivoted frames, and a vertically-adjustable stoprod extending transversely of said feeder-box through said curved slots.

In testimony that I claim the foregoing as my own I have hereto affixed my signature in the presence of two witnesses.

JOHN D. BARTON.

Witnesses:
LEVI MAXTED,
REASON RISLEY.